(12) United States Patent
Perdana et al.

(10) Patent No.: US 11,246,324 B2
(45) Date of Patent: Feb. 15, 2022

(54) HIGH MELTING POINT CHICKEN FAT

(71) Applicant: NESTEC S.A., Vevey (CH)

(72) Inventors: Jimmy Perdana, Singen (DE);
Prabhjot Kaur, Singen (DE);
Katharina Bulling, Stuttgart (DE);
Michele Marazzato, Konolfingen (CH);
Youngbin Kim, Singen (DE);
Christian Kjolby,
Bretigny-sur-Morrens (CH); Laurent Sagalowicz, Blonay (CH)

(73) Assignee: Societe des Produits Nestle S.A., Vevey (CH)

( * ) Notice: Subject to any disclaimer, the term of this patent is extended or adjusted under 35 U.S.C. 154(b) by 203 days.

(21) Appl. No.: 16/344,079

(22) PCT Filed: Oct. 20, 2017

(86) PCT No.: PCT/EP2017/076837
§ 371 (c)(1),
(2) Date: Apr. 23, 2019

(87) PCT Pub. No.: WO2018/077742
PCT Pub. Date: May 3, 2018

(65) Prior Publication Data
US 2020/0128841 A1 Apr. 30, 2020

(30) Foreign Application Priority Data
Oct. 31, 2016 (EP) .................................... 16196498

(51) Int. Cl.
*A23D 9/05* (2006.01)
*A23L 27/26* (2016.01)
*A23L 23/10* (2016.01)

(52) U.S. Cl.
CPC ............... *A23D 9/05* (2013.01); *A23L 23/10* (2016.08); *A23L 27/26* (2016.08); *A23V 2002/00* (2013.01)

(58) Field of Classification Search
CPC .. A23D 9/00; A23D 9/05; A23L 27/26; A23L 23/10; C11B 7/00; C11B 7/0075
USPC .......................................................... 426/589
See application file for complete search history.

(56) References Cited

U.S. PATENT DOCUMENTS

| 4,855,157 | A | * | 8/1989 | Tashiro |
| 2005/0142275 | A1 | | 6/2005 | Bach et al. |

FOREIGN PATENT DOCUMENTS

| CN | 105494690 A | * | 4/2016 | ............... A23D 9/04 |
| EP | 2534956 | | 12/2012 | |
| FR | 2867952 A1 | * | 9/2005 | ............. A23L 13/50 |
| WO | 0209529 | | 2/2002 | |
| WO | 2006063690 | | 6/2006 | |
| WO | 2006063694 | | 6/2006 | |

OTHER PUBLICATIONS

Fractionation of chicken fat triacylglycerols; Lee et al; Journal of Food Science—vol. 65,No. 5 2000 (Year: 2000).*

* cited by examiner

*Primary Examiner* — Jyoti Chawla
(74) *Attorney, Agent, or Firm* — K&L Gates LLP

(57) ABSTRACT

The invention relates to a high melting point chicken fat produced by dry fractionation of semi-liquid chicken fat. In particularly the invention relates to a chicken fat wherein the chicken fat having a total saturated fat content of 48 to 72 wt % (based on weight of total fat) comprising the fatty acids C16:0 in the range of 36 to 55 wt % (based on weight of total fat) and C18:0 in the range of 11 to 19 wt % (based on weight of total fat).

11 Claims, No Drawings

HIGH MELTING POINT CHICKEN FAT

CROSS REFERENCE TO RELATED APPLICATIONS

The present application is a National Stage of International Application No. PCT/EP2017/076837, filed on Oct. 20, 2017, which claims priority to European Patent Application No. 16196498.6, filed on Oct. 31, 2016, the entire contents of which are being incorporated herein by reference.

TECHNICAL FIELD

The invention relates to a high melting point chicken fat and the manufacturing process for the production thereof. In particularly the invention relates to a chicken fat wherein the chicken fat having a total saturated fat content of 48 to 72 wt % (based on weight of total fat) comprising the fatty acids C16:0 in the range of 36 to 55 wt % (based on weight of total fat) and C18:0 in the range of 11 to 19 wt % (based on weight of total fat).

BACKGROUND

Chicken fat is a well-known ingredient in food manufacturing due to its flavour and nutritional value. In particular, chicken fat is not restricted by any religious belief. In its original form, chicken fat contains of 25 to 29 wt % of saturated fatty acid content (based on weight of total fat). It is usually prone to faster rancidity at room temperature of 20° C. It is semi-liquid at room temperature of 20° C. and has limitations on its application due to the low slip melting point. This limitation becomes more important in bouillon products where fat structuring properties are required for industrial process-ability and shelf life. Introducing chicken fat into powdered recipes through mixing requires complex process, e.g. melting and spraying units. An amount of 3 wt % of chicken fat in the recipes has been found detrimental to flow-ability of bouillon powder mixes. Inhomogeneous distribution of fats during mixing causes lumping and sticking powders that triggers dosing inaccuracy.

Usually culinary products such as bouillon tablets/cubes require a fat that remains solid at room temperature at 20° C. and even up to 40° C. to ensure tablet/cubes integrity/hardness. Such fat is also necessary to avoid staining of the packaging during shelf life. Staining is a common quality issue in bouillon tablets/cubes. Fat that is convertible to powdered format is desirable because it simplifies the manufacturing process with no need to melt the fat and ensures a good flow-ability of a bouillon mass resulting in efficient filling and/or tableting processes. Currently this high melting fats are usually based on palm fat, however palm fat is not consumer friendly. In addition palm fat has a neutral taste which on one side is an advantage while on the other side requires that flavour compounds/flavour extracts be added to a recipe to achieve a certain taste. For example chicken flavour has to be added to a chicken bouillon.

Chicken fat in its original form is usually semi-liquid at room temperature of 20° C. and so far there is no commercial or technical availability of a chicken fat which has a high solid fat content and slip melting point.

Hence there is an existing need in the art and food industry to provide a better solution for a high melting fat using no palm fat or no hydrogenated or partially hydrogenated fat. The Invention has developed a fractionated chicken fat which has a high slip melting point (>45° C.) and a solid fat content (>30% at 30° C.). This development delivers fat structuring properties, total flavour reduction and total fat reduction in bouillons. It is also desirable to be able to produce chicken fat in powdered form. The introduction of chicken fat in powdered form into recipes simplifies processes thus eliminating the need of fat melting and spraying unit during mixing.

SUMMARY OF THE INVENTION

The objective of the present invention is to improve the state of the art or at least provide an alternative fat:
 i) use a fat well perceived by consumer;
 ii) A fat that is solid at room temperature (20° C.) or even at a temperature of >45° C.
 iii) avoid the use of hydrogenated oils and fats;
 iv) avoid the use of solvent extraction;
 v) use a fat which is stable against rancidity;
 vi) make a fat powder by spray-chilling;
 vii) deliver the fat with good flow-ability after powdering showing no lumps;
 viii) enable better distribution of fats during mixing with other ingredients;
 ix) avoid lumps and stickiness during mixing with other ingredients;
 x) provide no lumps by same mixing parameters with other ingredients (batch size, speed and time).
 xi) improve dosing accuracy of a bouillon powder;
 xii) enable reduction of total quantity of fat;
 xiii) reduce factory complexity of handling two fats—for example standard chicken and palm fat;
 xiv) deliver flavour from the fat and hence reduce the added flavour quantity within a recipe.

The object of the present invention is achieved by the subject matter of the independent claims. The dependent claims further develop the idea of the present invention.

Accordingly, the present invention provides in a first aspect a chicken fat having a melting point of 46 to 60° C. and a total saturated fat content of 48 to 72 wt % (based on weight of total fat) comprising the fatty acids C16:0 in the range of 36 to 55 wt % (based on weight of total fat) and C18:0 in the range of 11 to 19 wt % (based on weight of total fat).

In a second aspect of the invention, there is provided a process for the preparation of a chicken fat via dry fractionation process. The dry fractionation process comprising
 a) Melting chicken fat at a temperature of 60 to 80° C.;
 b) Cooling the melted chicken fat of step a) to a temperature of 25 to 5° C., preferably of 20 to 5° C., preferably of 15 to 5° C., within 5 to 50 h, preferably within 5 to 20 h, more preferably within 8 to 15 h;
 c) Filtering and pressing the cooled fat of step b) with pressures up to 35 bar, preferably up to 30 bar, more preferably up to 20 bar for 1 to 12 h, preferably for 2 to 6 h;
 d) Melting the obtained fat of step c) at a temperature of 60 to 90° C., preferably at a temperature of 65 and 85° C.;
 e) Cooling the melted chicken fat of step d) to a temperature of 55 to 30° C., preferably of 55 to 35° C., preferably of 50 to 40° C., within 5 to 50 h, preferably within 5 to 20 h, more preferably within 8 to 15 h;
 f) Filtering and pressing the cooled fat of step e) with pressures up to 35 bar, preferably up to 30 bar, more preferably up to 20 bar for 1 to 12 h, preferably for 2 to 6 h.

A third aspect of the invention relates to a use of a process for preparation of powdered chicken fat having a total saturated fat content of 48 to 72 wt % (based on weight of total fat) comprising the fatty acids C16:0 in the range of 36 to 55 wt % (based on weight of total fat) and C18:0 in the range of 11 to 19 wt % (based on weight of total fat).

DETAILED DESCRIPTION

The present invention pertains to a chicken fat having a total saturated fat content of 48 to 72 wt % (based on weight of total fat) comprising the fatty acids C16:0 in the range of 36 to 55 wt % (based on weight of total fat) and C18:0 in the range of 11 to 19 wt % (based on weight of total fat).

In a preferred embodiment the present invention pertains to a chicken fat having a total saturated fat content of 53.5 to 72 wt % (based on weight of total fat) comprising the fatty acids C16:0 in the range of 39.5 to 55 wt % (based on weight of total fat) and C18:0 in the range of 12.5 to 19 wt % (based on weight of total fat).

"Slip Melting point" is defined according to AOCS Official Method Cc 3-25 as the temperature at which fat softens and becomes sufficiently fluid to slip in an open capillary tube.

"Chicken fat" according to this invention having a melting point of 46 to 58° C. and a total saturated fat content of 48 to 72 wt % (based on weight of total fat) and comprises the fatty acids C16:0 in the range of 36 to 55 wt % (based on weight of total fat) and C18:0 in the range of 11 to 19 wt % (based on weight of total fat) is a fractionated chicken fat, preferably a double fractionated chicken fat. In a preferred embodiment, the hard bouillon tablet of the present invention does not include hydrogenated fat. In an embodiment the fat has a total saturated fat content of 48 to 72 wt % (based on weight of total fat), preferably 53.5 to 70 wt % (based on weight of total fat), preferably 54.5 to 68 wt % (based on weight of total fat), more preferably 55 to 65 wt % (based on weight of total fat). In an embodiment C18:0 is Stearic acid. In a further embodiment C18:0 is in the range of 11 to 19 wt % (based on weight of total fat), preferably C18:0 is in the range of 12.8 to 19 wt % (based on weight of total fat), preferably C18:0 is in the range of 13 to 18 wt % (based on weight of total fat), preferably C18:0 is in the range of 13 to 17 wt % (based on weight of total fat), more preferably C18:0 is in the range of 13.2 to 16.5 wt % (based on weight of total fat). In an embodiment the fat has a solid fat content at 23° C. of 50 to 80 wt % (based on weight of total fat), preferably 56 to 78 wt % (based on weight of total fat), preferably 57 to 77 wt % (based on weight of total fat), more preferably 58 to 75 wt % (based on weight of total fat). In an embodiment the fat further comprises C16:0. C16:0 is Palmitic acid. In a further embodiment the fat further comprises C16:0 in the range of 36 to 55 wt % (based on weight of total fat), preferably C16:0 is in the range of 40 to 55 wt % (based on weight of total fat), preferably C16:0 is in the range of 39.5 to 55 wt % (based on weight of total fat), preferably C16:0 is in the range of 40 to 51 wt % (based on weight of total fat), preferably C16:0 is in the range of 40.5 to 50 wt % (based on weight of total fat), more preferably C16:0 is in the range of 41 to 49 wt % (based on weight of total fat). In an embodiment the fat has a slip melting point of 46 to 58° C., preferably a slip melting point of 48 to 58° C., preferably a slip melting point of 50 to 58° C., preferably a slip melting point of 52 to 58° C., preferably a slip melting point of 52.5 to 58° C., more preferably a slip melting point of 52.5 to 56° C. In an embodiment the fat is a 100% non-hydrogenated fat. In an embodiment the fat does not include palm fat.

Standard commercial available chicken fat (see example 1) has a total saturated fatty acid content of 25 to 27 wt % (based on weight of total fat) comprising the fatty acids C16:0 in the range of 18 to 23 wt % (based on weight of total fat) and C18:0 in the range of 3 to 7 wt % (based on weight of total fat). Chicken fat in its original form is semi-liquid/pasty at ambient condition at 20° C.

Herein, the powdered fat (or fat in powdered form) which is prepared by spray-cooling, spray-chilling, spray freezing, as in use in the present invention, is referred to as "powdered chicken fat". "Powdered chicken fat" according to this invention has particle size distribution with at least 50% of the particles (median diameter, D50) having diameter in the range of 15 to 1000 μm, preferably in the range of 20 to 900 μm, preferably in the range of 30 to 900 μm, preferably in the range of 40 to 700 μm, preferably in the range of 40 to 500 μm, preferably in the range of 50 to 400 μm, more preferably in the range of 50 to 300 μm.

"Fat droplets" according to this invention are prepared by spray-cooling, spray-chilling or spray freezing and have a particle size distribution with at least 50% of the particles having diameter in the range of 15 to 1000 μm, preferably in the range of 20 to 900 μm, preferably in the range of 30 to 900 μm, preferably in the range of 30 to 800 μm, preferably in the range of 40 to 700 μm, preferably in the range of 40 to 500 μm, preferably in the range of 50 to 500 μm, preferably in the range of 50 to 400 μm, more preferably in the range of 50 to 300 μm.

"Cold air" according to this invention is defined as having a temperature below 15° C., preferably in a range between 15° C. to −50° C., preferably in a range between 15° C. to −10° C.

"Circularity" means a shape factor to describe the shape of powdered chicken fat; independent of its size. It is the measure of roundness and therefore of how closely the shape of an object approaches that of a circle. In an embodiment the powdered chicken fat has an average circularity in the range of 0.65 to 1, preferably in the range of 0.7 to 1, preferably in the range of 0.75 to 1.

"Flow-ability" means flow properties on how easily a powder flows. Flow-ability (FFC) is quantified as the ratio of consolidation stress $\sigma_1$ to unconfined yield strength $\sigma_c$ according to "Schulze, D. (2006). Flow properties of powders and bulk solids. Braunschweig/Wolfenbuttel, Germany: University of Applied Sciences." In an embodiment flow-ability (FFC) of the powdered chicken fat is at least 1.5 at 23° C., preferably between the range of 1.5 to 12 at 23° C., preferably between the range of 1.5 to 10 at 23° C., preferably between the range of 1.75 to 8 at 23° C., preferably between the range of 1.75 to 6 at 23° C., more preferably between the range of 2 to 6 at 23° C.

In an embodiment flow-ability of the bouillon powder using powdered chicken fat is at least 3 at 23° C., preferably between the range of 3 to 20 at 23° C., preferably between the range of 3 to 15 at 23° C., preferably between the range of 3 to 10 at 23° C., preferably between the range of 3.3 to 10 at 23° C., preferably between the range of 3 to 7 at 23° C., preferably between the range of 3.3 to 7 at 23° C., preferably between the range of 3.3 to 6 at 23° C.

The induction period is a parameter for accelerated aging test to assess fat stability. It is defined as the period (measured in hours) during which no oxidative, volatile components are generated under certain defined conditions.

"Bouillon powder" means a dehydrated stock that is in powder form. In an embodiment a bouillon powder comprises ingredients such as salt, taste enhancing compounds like monosodium glutamate (MSG), sugar, starch or flour, flavouring components, vegetables, meat extracts, spices, colorants and fat.

EXAMPLES

The invention is further described with reference to the following examples. It is to be appreciated that the examples do not in any way limit the invention.

Example 1: The General Procedure for Preparing a Chicken Fat of the Invention is as Follows The fat of the invention can be produced by physical separation means (e.g. dry fractionation process) from normal chicken fat.

An amount of 10 kg chicken fat was heated at 70° C. and kept for a minimum of 1 hour until completely melted (clear liquid was observed). The molten fat is subjected to crystallization in a pilot scale crystalliser (L-Frac from DeSmet Ballestra, Belgium) by controlled cooling steps from 70° C. to reach a temperature between 8 and 15° C. under gentle stirring (15-30 rpm) for 2 to 30 h, preferably for 5 to 20 h. Temperature profile of cooling steps are appropriately set in such a manner that a product to be obtained after the crystallization will be large suspended stearin particles in a olein slurry that can be transported by a pump or pressured air. Cooling was performed using a ramp profile with isothermal steps in between. Subsequently, the slurry was transferred to a membrane filter press and filtered and pressed with pressures up to 35 bar, preferably up to 30, more preferably up to 20 bar, for 1 to 6 h, preferably for 2 to 4 h. This process step delivers a fat as comparison example 3.

Cooling Profile of the First Fractionation Step

| Step | Temperature (° C.) | | Duration |
|---|---|---|---|
| number | Initial | Final | (hh:mm) |
| 1 | 70 | 30 | 04:00 |
| 2 | 30 | 30 | 01:40 |
| 3 | 30 | 25 | 01:40 |
| 4 | 25 | 25 | 01:20 |
| 5 | 25 | 21 | 01:20 |
| 6 | 21 | 21 | 01:00 |
| 7 | 21 | 15 | 02:00 |
| 8 | 15 | 15 | 01:00 |
| 9 | 15 | 10 | 01:40 |
| 10 | 10 | 10 | 02:00 |

After filtration and pressing, the recovered solid cake (stearin) was heated at 80° C. and kept at 1 hour to ensure it was completely melted (clear liquid was observed). The molten fat is subjected to crystallization in a pilot scale crystalliser (L-Frac from DeSmet Ballestra, Belgium) by controlled cooling from 80° C. to a temperature between 40 and 55° C., preferably between 45 and 50° C., under gentle stirring (15-30 rpm) for 2 to 30 h, preferably for 5 to 20 h. Temperature profile of cooling steps are appropriately set in such a manner that a product to be obtained after the crystallization will be large suspended stearin particles in a olein slurry that can be transported by a pump or pressured aft. Cooling was performed using a ramp profile with isothermal steps in between. Subsequently, the slurry was transferred to a membrane filter press and filtered and pressed with pressures up to 35 bar, preferably up to 30 bar, more preferably up to 20 bar for 1 to 6 h, preferably for 2 to 4 h. A fat is obtained as described within example 3-5, preferably example 5. Examples 3-4 can be also prepared by mixing a fat of example 5 with a fat of comparison example 2 (fat blend).

Cooling Profile of the Second Fractionation Step

| Step | Temperature (° C.) | | Duration |
|---|---|---|---|
| number | Initial | Final | (hh:mm) |
| 1 | 80 | 55 | 03:00 |
| 2 | 55 | 55 | 03:00 |
| 3 | 55 | 50 | 01:00 |
| 4 | 50 | 50 | 02:00 |
| 5 | 50 | 48 | 01:00 |
| 6 | 48 | 48 | 05:00 |

Induction Period of Fat:

The induction period is defined as the period (measured in hours) during which no oxidative, volatile components are generated under certain defined conditions. The induction period is determined based on ISO method 6886:2006; Rancimat/Oxidative Stability Instrument; at 110.0±0.1° C. (230±0.2° F.); 3.0±0.01 g oil, airflow: 10.0 I/h.

Method for Spray Freezing Powdered Fat:

Fat was melted at 70° C., then sprayed into a container containing liquid nitrogen. The resulting powder was collected and stored at 7° C. for 12 h.

Microscopy Analysis of Fat Powder:

Fat powder sample was spread over objective glass then viewed under Olympus BX51 microscope equipped with Olympus UPlanFL 10×/0.30 Microscope Objective, U-TV1x-2 projection lens, and UC30 CCD camera. Images were captured using analySIS auto version 5.1 software (Olympus Soft Imaging GmbH, Germany). Image analysis was carried out using ImageJ ver. 1.5i (National Institutes of Health, USA).

Flowability Analysis

Flow-ability was measured using a Schulze Ring Shear Tester RST-01.pc according to ASTM D6467. Flow-ability was presented as Flowability Index (FFC). Pre-shear normal stress was set to 2600 Pa and shear normal stress to 390, 1235, and 2080 Pa.

Examples 2-6

| Fat composition | Comp. Ex. 2 | Comp. Ex. 3 | Ex. 4 | Ex. 5 | Ex. 6 |
|---|---|---|---|---|---|
| C16:0 (g/100 g) | 21.2 | 32.7 | 39.3 | 42.2 | 45.1 |
| C18:0 (g/100 g) | 5.01 | 9.3 | 12.2 | 13.5 | 14.9 |
| SFA (g/100 g) | 27 | 43.3 | 52.9 | 57.2 | 61.6 |
| SFC at 23° C. (%) | 3.5 | 45.7 | 54.7 | 62.2 | 71.6 |
| SFC at 30° C. (%) | 1.3 | 27.2 | 43.8 | 51.3 | 59.6 |
| Slip melting point (° C.) | <25 | 42.8 | 51.4 | 53.2 | 53.9 |
| Induction period (h) at 110° C. | 12.1 | 26.1 | 34.1 | 35.8 | 40.5 |
| Appearance of powdered fat | Liquid/pasty; no powder | Lumps | No lumps | No lumps | No lumps |

Chicken fat in its original form (standard chicken fat) as shown within comparison example 2 is semi-liquid at ambient temperature of 20° C. and having the lowest induction period. In addition it is not possible to make a powder fat of comparison example 2. A powdered fat of comparison example 3 shows lumps. Fats of the invention (example 4 to 6) have a higher slip melting point and induction period compared to examples 1 to 2. An advantage of this fat is, that a powdered form can be produced without forming lumps.

Examples 7-11

Preparation of Bouillon (Seasoning) Powder with Powdered Fat:

Crystalline ingredients (e.g. salt, MSG), amorphous ingredients (e.g. starch) and flavourings (in powdered form) were weighted in PG5002S balance (Mettler-Toledo, USA) and then mixed manually. The powdered fat was added to the other pre-mixed ingredients and further mixed using Thermomix Type 31-1 (Vorwerk Elektrowerke GmbH & Co.AG, Germany) at speed 3 for 30 s with propeller rotation set to reverse direction. One batch mixing was carried out for 500 g bouillon powder. The resulting powder was then immediately used to measure 20 flow-ability as no fat recrystallization time is relevant.

|  | Ex. 7 | Ex. 8 | Ex. 9 | Ex. 10 | Ex. 11 |
|---|---|---|---|---|---|
| Recipe |  |  |  |  |  |
| Salt | 49 wt % | 49 wt % | 49 wt % | 49 wt % | 49 wt % |
| MSG | 20 wt % | 20 wt % | 20 wt % | 20 wt % | 20 wt % |
| Maltodextrin | 10 wt % | 10 wt % | 10 wt % | 10 wt % | 10 wt % |
| Starch | 10 wt% | 10 wt % | 10 wt % | 10 wt % | 10 wt % |
| Flavourings | 1 wt % | 1 wt % | 1 wt % | 1 wt % | 1 wt % |
| Fat | 10 wt % chicken fat | 10 wt % chicken fat | 10 wt % chicken fat | 10 wt % chicken fat | 10 wt % chicken fat |
| Fat Composition |  |  |  |  |  |
| C16:0 | 21.2 | 32.7 | 39.3 | 42.2 | 45.1 |
| C18:0 | 5.01 | 9.3 | 12.2 | 13.5 | 14.9 |
| SFA (g/100g) | 27 | 43.3 | 52.9 | 57.2 | 61.6 |
| SFC at 23° C. |  |  |  |  |  |
| FFC bouillon powder with powdered fat at 23° C. | 1.4 lumps | 1.9 lumps | 3.6 no lumps | 4.2 no lumps | 5.0 no lumps |

The comparison example 7 using standard powdered chicken fat or a single fractionated chicken fat as shown by comparison example 8 have a lower flow-ability of a resulting bouillon powder as the chicken fat of the invention as shown within examples 9 to 11. Next to the lower flow-ability of a bouillon powder within comparison examples 7 and 8 lumps within the bouillon powder are observed. No lumps within the bouillon powder are observed for examples 9 to 11. A flow-ability of the bouillon powder above 3 at 23° C. delivers accurate dosing.

Example 12-13: Comparison of Bouillon Taste

| Recipe | Ex. 12 | Ex. 13 |
|---|---|---|
| Salt | 48.6 wt % | 48.6 wt % |
| Sugar | 12.5 wt % | 12.5 wt % |
| Starch | 11.2 wt % | 23.6 wt % |
| Yeast extract and vegetable extracts, | 5.3 wt % | 5.3 wt % |
| Flavorings including chicken flavor | 9.4 wt % | — |
| Palm fat | 10.0 wt % | — |
| Chicken fat as within example 2 | 3.0 wt % | — |
| Chicken fat as within example 6 | — | 10.0 wt % |

6 internal experienced panelists were used to rate the taste of a bouillon prepared from example 12 and 13. A hard bouillon tablet of 10 gr has been diluted in 500 ml hot water (80° C.). All 6 panellists rated example 13 as being meatier and having a stronger chicken taste compared to example 12. As shown above example 13 has a less total amount of fat (10% in example 13 vs 13% in example 12) and no chicken flavor at all within the recipe.

The invention claimed is:

1. A chicken fat having a total saturated fat content of 48 to 72 wt % (based on weight of total fat) comprising fatty acids C16:0 in a range of 39.5 to 55 wt % (based on weight of total fat) and C18:0 in a range of 12.5 to 19 wt % (based on weight of total fat), and the chicken fat is a powder having a flow-ability of at least 1.5 at 23° C.

2. The chicken fat of claim 1, wherein the chicken fat is a non-hydrogenated chicken fat.

3. The chicken fat of claim 1, wherein the chicken fat is a non-hydrogenated fractionated chicken fat.

4. The chicken fat of claim 1, wherein the chicken fat has a slip melting point of 46 to 58° C.

5. The chicken fat of claim 1, wherein the chicken fat has a solid fat content in the range of 50 to 80 wt % (by weight of the total fat) at 23° C.

6. The chicken fat of claim 1, wherein the powder has a particle size in the range of 15 to 1000 μm.

7. A process for preparation of a chicken fat, wherein the chicken fat has a total saturated fat content of 48 to 72 wt % (based on weight of total fat) comprising fatty acids C16:0 in a range of 39.5 to 55 wt % (based on weight of total fat) and C18:0 in a range of 12.5 to 19 wt % (based on weight of total fat), the process comprising:
melting a raw chicken fat at a temperature of 60 to 80° C. to obtain a first melted chicken fat;
cooling the first melted chicken fat to a temperature of 25 to 5° C. to obtain a first cooled chicken fat;
filtering and pressing the first cooled chicken fat with a pressure up to 35 bar to obtain a filtered and pressed chicken fat;
melting the filtered and pressed chicken fat at a temperature of 60 to 90° C. to obtain a second melted chicken fat;
cooling the second melted chicken fat to a temperature of 55 to 30° C. to obtain a second cooled chicken fat; and
filtering and pressing the second cooled fat with pressures up to 35 bar,
wherein the chicken fat is a powder having a flow-ability of at least 1.5 at 23° C.

8. The process of claim 7, comprising stirring the fat between 10 to 100 rpm during at least one of (a) the cooling of the first melted chicken fat or (b) the cooling of the first melted chicken fat.

9. A method for preparing a food product, the method comprising using a chicken fat in the food product, the chicken fat having a total saturated fat content of 48 to 72 wt % (based on weight of total fat) comprising fatty acids C16:0 in a range of 39.5 to 55 wt % (based on the weight of the total fat) and C18:0 in a range of 12.5 to 19 wt % (based on the weight of the total fat), and the chicken fat is a powder having a flow-ability of at least 1.5 at 23° C.

10. The method of claim 9, wherein the food product is selected from the group consisting of a soup, a bouillon powder and a bouillon tablet/cube.

11. The method of claim 10, wherein the food product is a bouillon tablet/cube, and the bouillon tablet/cube is soft or hard.

* * * * *